United States Patent

[11] 3,619,342

| [72] | Inventor | William D. Burke<br>West Springfield, Mass. |
|---|---|---|
| [21] | Appl. No. | 843,125 |
| [22] | Filed | July 18, 1969 |
| [45] | Patented | Nov. 9, 1971 |
| [73] | Assignees | Alton Box Board Company<br>Alton, Del.;<br>Monsanto Company<br>Saint Louis, Mo. |

[54] CORRUGATED FIBERBOARD
5 Claims, 2 Drawing Figs.

[52] U.S. Cl. .................................................... 161/133,
117/155 L, 161/264, 260/29.3, 260/51.5, 260/840
[51] Int. Cl. ...................................................... B32b 3/28,
B32b 27/42, C08g 37/16
[50] Field of Search ........................................... 117/155 L;
161/133, 264; 260/29.3, 51.5, 840

[56] References Cited
UNITED STATES PATENTS

| 1,944,143 | 1/1934 | Bender | 161/264 X |
|---|---|---|---|
| 2,334,904 | 11/1943 | Cheetham | 260/840 |
| 2,463,148 | 3/1949 | Caesar et al. | 260/17.3 |
| 2,886,540 | 5/1959 | McNaughton et al. | 260/17.2 (S) |
| 3,006,879 | 10/1961 | Ryan et al. | 260/29.3 |
| 3,223,668 | 12/1965 | Stalego | 260/840 X |
| 3,380,877 | 4/1968 | Smucker et al. | 260/51.5 X |
| 3,431,162 | 3/1969 | Morris | 161/133 |
| 3,444,119 | 5/1969 | Le Blanc | 260/29.3 |

*Primary Examiner*—Robert F. Burnett
*Assistant Examiner*—Stephen M. Hoffman
*Attorneys*—John W. Klooster, Arthur E. Hoffman and Russell H. Schlattman ABSTRACT: Corrugated fiberboard which resists deterioration in strength when in the presence of moisture or water, and intermediate resin treated medium and liner sheet members useful in the manufacture thereof. Such board is made by treating medium and, optionally, liner members with a modified phenol aldehyde resole resin composition and thereafter bonding corrugated medium to liner members with the phenol aldehyde resole resin used as the waterproofing agent in a starch adhesive.

INVENTOR
WILLIAM D. BURKE

BY  JOHN W. KLOOSTER,
ARTHUR E. HOFFMAN,
RUSSELL H. SCHLATTMAN
ATTORNEYS 3,619,342

CORRUGATED FIBERBOARD

BACKGROUND

Corrugated fiberboard has been used for many years and for various purposes, but is well known to have poor wet strength properties. However, for some time, manufacturers of corrugated fiberboard have tried to remedy such inherent deficiencies in wet strength (as determined, for example, using postmoisture exposure crush resistance comparative measurements) by impregnating the paper sheeting used in making such board with various polymeric substances including phenolic resins. So far as is known, however, such efforts have not been successful in producing corrugated fiberboard of commercially useful quality; see, for example, Koning, Jr. and Fahey of the U.S. Forest Products Laboratory reported in "-Package Engineering," Vol. 10, No. 10, Oct. 1965, at pages 130 through 139.

Such previous efforts to improve wet strength using phenolaldehyde resins have generally not been successful because of a variety of problems, such as:

A. the prolonged and excessively high temperatures required for phenol-aldehyde resin curing (preventing the use in effect of phenolic resins on the high-speed machinery conventionally commercially used to make corrugated fiberboard);

B. the inability of conventional aqueous phenol-aldehyde resin systems to uniformly penetrate base paper stock during high-speed treating;

C. the embrittlement and even partial decomposition commonly associated with paper stock following phenol-aldehyde resin treatment and incorporation into corrugated fiberboard;

D. the lack of compatibility and good bonding between phenol-aldehyde thermoset resin treated base stock and adhesive systems used to bond such resin treated medium and liner sheets together into corrugated fiberboard; and the like.

It has surprisingly and unexpectedly now been discovered that each of such prior art problems can be overcome when a particular modified phenol-aldehyde resin treating system and an adhesive system containing such phenol-aldehyde resole resin are employed in conventional high-speed manufacturing equipment to make corrugated fiberboard having among other desirable properties generally superior postmoisture exposure crush resistance.

A significant advantage associated with the present invention is that the resin system used for impregnation of the base paper stock used in such fiberboard manufacture thermosets at significantly higher temperatures using shorter times than those needed to thermoset the adhesive system employed, thereby making it possible if desired to maximize wet strength in a product carton blank to first cure the adhesive used to make the board, then form the blank from the board, and finally cure the resin in the paper used to make the board rather than curing adhesive and resin in board manufacture. Consequently, one can, if desired, first manufacture corrugated fiberboard having good dry strength and flexibility characteristics, such as are desirable in further machine processing of corrugated fiberboard into manufactured articles like box blanks, etc., and then process such fiberboard into such manufactured articles. Thereafter, the impregnated resin can be thermoset, and the resulting corrugated fiberboard accordingly stiffened and rigidified by raising the so-manufactured articles to temperatures high enough to thermoset such impregnated resin. It is during this last heating (thermosetting) step that another significant advantage of our invention is appreciated: The particular resin employed in our invention thermosets so rapidly that the desired, normal, inherent moisture content of corrugated fiberboard is not depleted or reduced to the point where the product board is excessively and even permanently embrittled, which was a common fault with prior art treating resins.

Another advantage is that during thermosetting of impregnated resin and of adhesive, there is a low evolution of free formaldehyde into adjoining environment, with consequent unpleasant and even toxic fumes being foisted upon personnel.

Other and further advantages will be apparent to those skilled in the art from the present teachings.

SUMMARY

The present invention relates to a novel corrugated fiberboard construction adapted to have good wet strength, and to certain novel resin treated medium and liner sheet members useful as intermediates for the manufacture of such fiberboard. For purposes of the present invention, wet strength of corrugated fiberboard is conveniently measured comparatively using flat crush resistance data before and after moisture exposure by means of ASTM Test Procedure No. D-1225-D)

An intermediate sheet member of this invention which is adapted for use as a medium in the manufacture of corrugated fiberboard utilizes a paperboard ranging in thickness from about seven to 15 thousandths of an inch and having a grade weight of from about 25 to 36 pounds per 1,000 sq. ft.

Such a paper has been treated with from about 5 to 15 weight percent total (dry weight basis) of a modified phenolaldehyde resin system and said paper after such treatment has a total volatiles content of from about 5 to 10 weight percent.

The terms "treated," "treating," or "treatment" as used herein is generic to both impregnation and coating of the substrate paper itself; such can be accomplished in any convenient, conventional manner, as hereinafter further detailed and illustrated.

An intermediate sheet member of this invention which is adapted for use as a liner in the manufacture of corrugated fiberboard utilizes a paperboard ranging in thickness from about 5-20 thousandths of an inch and having a grade weight of from about 33 to 120 pounds per 1,000 sq. ft.

Such a paper has been treated with from about 2 to 10 weight percent (total dry weight basis) of such a modified phenol-aldehyde resin system and said paper after such treatment has a total volatiles content of from about 5 to 10 weight percent.

Liner sheet members used in the novel corrugated fiberboard constructions of this invention need not be, but preferably are, treated with such a modified phenol-aldehyde resin system.

A corrugated fiberboard construction of this invention employs a treated medium, as above described, and a liner (preferably, though not necessarily, a treated one, as above described). Each such medium is corrugated and positioned adjacent to a liner member on one side thereof (preferably there is a liner in each side of a corrugated medium). Each liner is bonded to its adjoining medium at positions of mutual contact therebetween with an adhesive which is interposed between such a liner sheet member and such a medium sheet member at such positions of mutual contact (typically the tips of the corrugated medium flutes).

The modified phenol-aldehyde resin system used comprises:

A. from about 80 to 94 weight percent (based on total modified phenol-aldehyde resin system dry weight basis) of a phenol-formaldehyde resole resin, B. from about 1 to 5 weight percent (same basis) of at least one inorganic ammonium salt having a pH of from about 0.8 to 6.5 when in a 5 weight percent aqueous solution, such as, for example, ammonium chloride (preferred), and other ammonium halides, ammonium sulfate, ammonium phosphate (including acid salts thereof), ammonium nitrate, and the like, C. the remainder up to 100 weight percent (same basis) of any given such system of urea. This resin has a pH in the range of from about 0.8 to 6 (preferably about 1 to 4) when in the form of an aqueous solution of about 35 weight percent total resin system solids.

The phenol-formaldehyde resole resin used in this resin system is itself characterized by having:

A. a water solubility such that about a 55 weight percent aqueous solution of resole resin solids can be prepared, B. a combined average number of mols of formaldehyde per phenol ring of from about 0.9 to 3.0, C. a pH of from about 7 to 9.2 when in the form of an aqueous solution of about 35 weight percent total resin solids, and D. an ash content of less than about 2.5 weight percent (based on about a 35 weight percent solution of total resin solids).

The adhesive utilizes the above described resole resin and starch. This adhesive system is characterized by:

A. having a total phenol to total starch weight ratio (based on total adhesive system solids) of about 1 to 8, B. containing at least about 1 weight percent (based on total adhesive system solids) of combined formaldehyde, preferably, and C. containing at least about 70 weight percent of starch (based on total adhesive systems solids).

Such adhesive system is, at the time of use to make corrugated fiberboard of this invention, in the form of an aqueous dispersion having a total solids content of from about 15 to 30 weight percent, a viscosity of from about 200 to 8000 centipoises.

STARTING MATERIALS

As those skilled in the art will appreciate, in the art of corrugated fiberboard, it has been conventional to employ as the medium sheet member either Kraft paper or jute paper. A corrugated medium member is formed by running a continuous sheet of medium through corrugating rolls. The medium, or "9 point" as it is sometimes called, takes on a wavelike shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1000 sq. ft. having a thickness of about 0.009 inch for all grades of combined board, but for purposes of the present invention, may be heavier or lighter for special requirements. Corrugating medium, for example, is most commonly made from "semichemical" pulp but is also made from straw, craft, bogus, or chip (mixed, repulped fibers).

There are four conventional or standard sizes of corrugations as follows:

TABLE I

| Designation | Number of Flutes per foot (approximate) | Thickness of Single Wall Board[1], in. |
|---|---|---|
| A | 33–39 | 0.185–0.210 |
| B | 47–53 | 0.097–0.105 |
| C | 39–45 | 0.139–0.145 |
| D | 90–97 | 0.045–0.0624 |

[1]Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate Kraft, but sometimes are made from other pulps.

Kraft for liner sheet members is usually made on a Fourdrinier machine although some is made on a cylinder machine. Commonly, liner sheet members are made to standard weights which are 26, 33, 38, 42, 47, 62, 69, and 90 pounds per 1000 sq. ft with thicknesses for liner sheet members ranging from 0.009 inch to 0.025 inch.

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single face board; when facings are on both sides of the corrugated medium sheet member, the product is sometimes called single wall board or double face board. If there are two sheets of flutes with a facing on each side and one in the middle, the product is sometimes called double wall board. If there are three layers of flutes with two outer liner facings and two inner liner facings between media layers, the product is sometimes called triple wall board.

The modified phenol-aldehyde resin system can be made by any conventional procedure known to the art of phenolic resins. For example, one convenient and preferred procedure involves condensing usually at temperatures ranging from about 50° to 80° C. phenol and formaldehyde in the above-indicated desired mol ratio under aqueous liquid phase conditions in the presence of a basic catalyst, such as an alkali metal hydroxide such as sodium hydroxide or an alkaline earth hydroxide such as calcium hydroxide, a trialkyl amine such as triethylamine, and the like until a desired end point is reached, such as, for example, a free formaldehyde content which is less than about 3 to 10 weight percent.

The product is a phenol-formaldehyde resole resin in aqueous solution having a total solids content of from about 30 to 70 weight percent. Usually, and preferably, the resin solution is prepared as a concentrate of from about 40 to 55 weight percent solids (based on the total solution weight) which may be conveniently and preferably diluted down before use to a solids content of from about 5–50 weight percent. Preferably, the solids content of the concentrate ranges from about 45–60 weight percent and preferably the solids content of the diluted working solution ranges from about 15–45 weight percent.

For use in the products of this invention, it has been found that this resole resin should not be advanced in manufacture beyond the point where it has a water solubility such that about a 55 weight percent solids in aqueous solution thereof can be prepared (preferably about 30 weight percent). Also, it has been found that this resole resin should have a methylol content per aromatic ring of from about 0.5 to 3 (preferably from about 1 to 2.5) as determined, for example, by NMR measurements.

If such resin is more advanced (i.e. has a high molecular weight) than such a solubility as above indicated, or if such resin has a different methylol content than that above indicated, then it appears to have undesirable paper treating characteristics, especially at the high application speeds conventionally employed for paper transport in the manufacture of corrugated fiberboard, for purposes of making the improved products of this invention.

In addition, it has been found that this resole resin should have a pH of from about 5.6 to 9.2 when in the form of an aqueous solution of about 35 weight percent total resin solids (preferably from about 7 to 8.5). Also, it has been found that this resole resin should have an ash content of less than about 2.5 weight percent based on about a 35 weight percent aqueous solution of total resin solids (preferably less than about 0.7).

One convenient way in which to measure the ash content for present purposes is to take 2 grams of such an aqueous solution (35 percent solids) and deposit same in a crucible. The crucible is then heated to about 150° C. for about 2 hours to substantially completely crosslink the resin and evaporate free water and thereafter the crucible is exposed to about 1000° F. for about 24 hours. Afterwards, the crucible is cooled to room temperature and measured to determined an increase in weight over starting empty weight thereby giving the ash content of the resin.

If such resin has a lower or higher pH, or a higher solids content, than those respectively about above indicated, then it appears to have undesirable effects upon product paper treated therewith, especially in the properties of corrugated fiberboard made therefrom, for purposes of making the improved products of this invention.

In making the modified phenol-aldehyde resin systems for use in this invention, it is generally convenient and preferred to add the ammonium salt and the urea in the respective amounts above indicated, each in the form of a finely divided powder, or even (preferably) already dissolved in water, to the diluted or partially diluted phenol-formaldehyde resole resin (just described). Such addition causes the pH of this product system to fall in the range from 0.8 to 6, as above described.

Sometimes in order to make the pH of the product phenol-aldehyde resin system low, yet within the indicated range, one may, if desired, add to a given resole resin solution, preferably diluted for use and with the ammonium salt and urea already dissolved therewith, amounts of a strong inorganic acid, such as hydrochloric, or the like, until the pH is lowered to some desired value; however, such an acid addition is generally not necessary owing to the presence of the ammonium salt which itself tends to produce a pH within the ranges indicated.

The ammonium salt and the urea are conveniently not added to the resole resin solution until shortly before a medium or liner sheet member is to be treated with a resin system, and they are conveniently added thereto in a previously water dissolved form.

The medium and liner can be treated with a resin system by immersion or any other convenient coating techniques. For example, in liner treatment, a preferred method involves surface coating rather than immersion impregnation. Suitable coating procedures involve application to one surface of a liner with a brush, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat medium sheet members with a resin system.

After treatment, a medium or liner sheet member is dried by passing such over or through a hot zone such that the temperature of the liner and/or the medium does not exceed about 225° F. for more than about 0.1 second so as to avoid thermosetting the resin system. In drying, water is substantially completely removed without appreciable advancement or curing of the resin impregnated into the liner or medium sheet member. Thus, the percentage of volatiles in a treated liner or medium is controlled within the ranges above indicated. For example, if the percentage of volatiles is reduced below such range, the resin system tends to crosslink and subsequently during corrugated fiberboard production reduced adhesive bonding to such a resin crosslinked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate. Next, if not stored intervenlngly, a treated medium and a liner member are combined together. Commercially, a conventional combining machine may be used for this operation.

The adhesive used in the combining operation is as characterized above. Such adhesives are known to the art.

Typically, an adhesive used to make a corrugated fiberboard of this invention at the time of application to medium is in the form of an aqueous system whose viscosity ranges from about 200 to 8000 centipoises (preferably 300 to 5000) and which has a total solids content of from about 15 to 30 weight percent. Usually, the adhesive system is in the form of a uniform heterogeneous aqueous dispersion in which some of the resin portion of the system is dissolved and some of the starch portion is dispersed. In general, the adhesive used is prepared just prior to the time of use by a fiberboard manufacturer or it is prepared by a supplier to him. Commonly, a supplier provides the adhesive as a one tank or two tank formulation, which is combined combined in the case of two tanks, and which is typically further diluted with water before actual application. Although an adhesive is generally discontinuously but automatically applied only only to the flutes of a corrugated treated medium when using machinery to make corrugated fiberboard of this invention, typical machine adhesive application rates range from about 3 to 12 pounds adhesive solids per 1000 sq. ft. of product corrugated fiberboard but more or less than this amount can be employed. Adhesive application rates are not critical and can be widely varied without departing from the spirit and scope of this invention.

After adhesive application, corrugated medium sheet member(s) and liner sheet member(s) are duly combined together, as in a so-called combining machine, into board, the resulting fiberboard construction is subjected to temperatures of from about 320 to 450° F. for times of from about 5 seconds to 10 minutes to complete manufacture. Afterwards, the product board can be rolled up in a storage configuration, as is commonly done in continuous corrugated fiberboard manufacture. Preferred temperatures for heating the combined corrugated medium sheet and liner sheet member(s) involve the use of temperatures of from about 320° to 370° F. applied for times of from about 5 to 15 seconds. Such preferred heating temperatures and times substantially completely thermoset the adhesive, but not the resin, thus bonding together the medium and liner sheet members at positions of mutual contact therebetween, thereby to form a desired corrugated fiberboard. When only the adhesive is thermoset, the product fiberboard is generally more limber and pliable than when the resin is thermoset, which is desirable when the fiberboard product is to be made into box blanks.

Preferably, a corrugated fiberboard construction of this invention is equipped with at least a pair of such liner sheet members so that such a preferred construction has its opposed faces composed of liner sheet members with a resin treated medium sheet interposed therebetween (and bonded by means of such adhesive, as indicated).

Usually, and conventionally, a corrugated fiberboard of this invention is promptly made into box blanks following manufacture, though it is possible and convenient to store the corrugated fiberboard before same is used to make box blanks. Box (or carton) blank manufacture is well known to those of ordinary skill in the art and does not form part of this invention. When corrugated fiberboard is directly converted into box blanks, it is conventional to place at the end of a combining machine knives which cut the corrugated fiberboard into the lengths required by the particular box to be made. Next, the resulting piece of board is scored longitudinally, so as to permit folding such board to make the top and bottom flaps of a box. In this operation, the sheet of fiberboard product is also longitudinally edge trimmed to an exact predetermined width. In some modern machines, during the operation of scoring longitudinally, the longitudinal edge trimming is performed before the corrugated fiberboard continuous sheet is cut to length for individual box blanks.

The next operation usually accomplishes three functions: The sheet is trimmed tranversely to a desired length, three slots with connecting score lines are cut on both sides of the sheet to form the individual top and bottom flaps, and any desired printing is applied to the surface (usually exteriorly).

Finally, in a fourth operation, the product box blank is folded so that the two ends come together and are then joined by taping, gluing, or stapling. This flattened "tube" can then be opened up into box form, the bottom flaps folded closed and sealed, the contents placed inside, and the top flaps folded and sealed.

If the corrugated fiberboard used to make the blanks does not have its resin treated medium and (optionally) liner members thermoset, a final blank processing step is preferably performed. Thus, in such event, usually before a blank (such as a flattened tube) is opened into box form, but after folding, scoring, slotting, and related operations are completed, a resulting carton blank is heated to a temperature and for a time sufficient to substantially completely thermoset the phenol-aldehyde resin system impregnated into the medium and (optionally) liner members of the board. In general, suitable temperatures for this purpose range from about 320° to 450° F. applied for times ranging from about 2 to 10 minutes (with higher temperatures requiring shorter cure times). Such a thermosetting increases the water resistance properties (e.g. crush resistance, as indicated above) of the product fiberboard and blank made therewith.

DESCRIPTION OF DRAWINGS

The invention is better understood by reference to the attached drawings wherein:

Turning to FIG. 1, there is seen a corrugated fiberboard construction of the present invention which is designated in its entirety by the numeral 10. Construction 10 is seen to incorporate a pair of facing liner sheet members 11 and 12. Interposed between liner sheet members 11 and 12 is a corrugated medium sheet member 13. The liner sheet members 11 and 12 are optionally treated with a phenolic resin as taught herein above, while the medium sheet member 13 is treated with a phenolic resin as taught herein above.

Figures 1, 2:
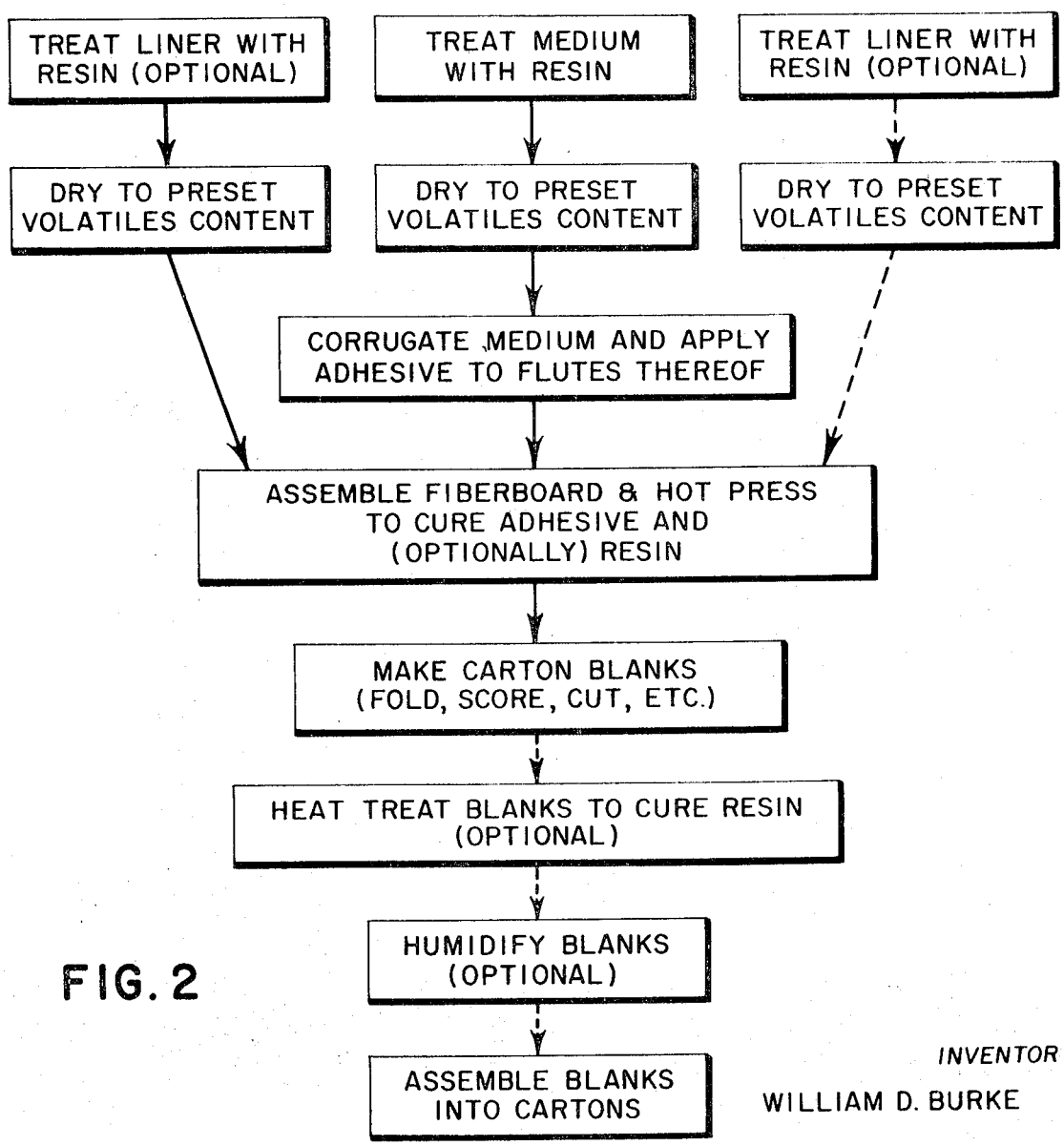
FIG. 1 is an enlarged, diagrammatic vertical cross-sectional view, some parts thereof broken away, of one embodiment of a corrugated fiberboard construction of this invention.
FIG. 2 is a simplified flow sheet illustrating the method of making corrugated fiberboard in accordance with the teachings of the present invention.

The tips of the flutes in the corrugated medium 13 are bonded to the adjacent faces of respective liner members 11 and 12 by means of an adhesive 14. Conventionally, the adhesive 14 is applied to the tips of the flutes during the combining operation of the medium 13 and the liners 11 and 12. After assembly, the construction 10 is heated as above described to thermoset the adhesive 14 and produce the corrugated fiberboard 10.

Steps in one embodiment of a process for making a fiberboard 10 are shown in FIG. 2. This block diagram is believed to be largely self-explanatory particularly in view of the foregoing description so no detailed explanation thereof is given herein. Observe that FIG. 2 merely illustrates one mode of practicing the present invention and that deviations and variations in accordance with the teachings of the present invention are possible without departing from the spirit and scope of this invention.

The machine used to make corrugated fiberboard usually combines into a single operation the steps of corrugating the medium, applying adhesives to the flutes thereof, and assembling the so-prepared medium with liner. Hot pressing of the so-assembled fiberboard is usually also accomplished in the same machine. Although the process embodiment of FIG. 2 discloses initially curing only the adhesive, it will be appreciated that it is convenient to practice the invention by curing both the adhesive and the resin for treatment of medium and liner members before making carton blanks from the fiberboard.

Those skilled in the art will appreciate that the type of corrugated fiberboard shown in FIGS. 1 and 2 is known to the trade as double faced corrugated fiberboard since a medium liner is combined with a so-called inner and so-called outer liner.

Single faced corrugated fiberboard is made by using a single corrugated medium member and a single liner member; double wall corrugated fiberboard comprises three liners with two corrugated medium members alternatively spaced between the liners; and triple wall corrugated fiberboard comprises seven thicknesses and is made by bonding two single faced boards into a double faced board in which there are four liners and three corrugated medium members. All such corrugated fiberboard constructions are within the contemplation of the present invention.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate resin systems and adhesives suitable for use in making products of this invention.

EXAMPLE A

A suitable phenol-formaldehyde resole resin for use in this invention is prepared as follows:

To 100 parts of phenol in a reaction kettle are added first 180 parts of 50 percent formalin and then four parts of sodium hydroxide sufficient to bring the pH to about 8.6. The mixture is refluxed for about 3 hours at about 65° C., while maintaining a reaction pH of about 8.6. Thereafter, this mixture is cooled to about 40° C. This mixture is then neutralized to pH of about 7.0 with aqueous diluted hydrochloric acid. The resulting mixture is dehydrated under vacuum to the desired solids level (see table A below). The product yield is about 270 weight percent based on starting phenol. The product has a water solubility such that a 55 weight percent aqueous solution of resole resin solids can be prepared. The resin characteristics are summarized in table A below.

EXAMPLE B

Another suitable phenol-formaldehyde resole resin for use in this invention is prepared as follows:

To 100 parts of phenol in a reaction kettle are added first 170 parts of 50 percent formalin and then six parts of calcium hydroxide sufficient to bring the pH to about 8.6. The mixture is refluxed for about 4 hours at 62° C. Thereafter, the mixture is cooled to 40° C. The mixture is then neutralized to a pH of 7.2 with carbon dioxide. The resin is filtered to remove the calcium carbonate. The product has a water solubility such that a 55 weight percent aqueous solution of resole resin solids can be prepared. The resin characteristics are summarized in table A below.

EXAMPLE C

Another suitable phenol-aldehyde resole resin for use in this invention is prepared as follows:

To 100 parts phenol in a reaction kettle are added 150 parts of 50 percent formalin and four parts triethylamine amine as a catalyst. The mixture is refluxed at about 70° C. for about 4 hours until a free formaldehyde end point of 8.6 percent is reached. The resin product is then cooled to 30° C. It has a solids content of about 48.0 weight percent. The product has a water solubility such that a 55 weight percent aqueous solution of resole resin solids can be prepared. The resin characteristics are summarized in table A below.

TABLE A

| Example | A | B | C |
| --- | --- | --- | --- |
| Total resin solids in aqueous solution | 55 | 50 | 48 |
| Free formaldehyde [1] | 9 | 6 | 8.5 |
| pH [2] | 7 | 7.2 | 8.0 |
| Combined average moles formaldehyde per aromatic ring [3] | 2.25 | 2.25 | 2.15 |
| Ash content [4] | 2.3 | 0.3 | Zero |

[1] Free formaldehyde content determined by the so-called hydroxylamine hydrochloride method.
[2] pH measured at 25° C. using an aqueous solution of about 35 weight per cent total resin solids.
[3] Measured by methylol content and methylene bridges per aromatic ring using nuclear magnetic resonance on a sample of product.
[4] Ash content determined using a 35 weight percent aqueous solution of total resins at 170° F. at 2 hours and thereafter pyrolyzed for 24 hours at 1,000° F.

EXAMPLE D

A modifier solution is prepared by dissolving 30 parts by weight of urea and 10 parts of ammonium chloride in 60 parts of water.

EXAMPLE E

A modifier solution is prepared by dissolving 400 parts by weight of urea and 150 parts by weight of ammonium chloride in 600 parts of water.

EXAMPLE F

A modifier solution is prepared by dissolving 50 parts by weight urea and 30 parts by weight ammonium sulfate in 100 parts water.

EXAMPLE G

A phenol-aldehyde resin system treating solution is made by diluting 50 parts of the resin of example A with 25 parts of water and then adding thereto eight parts of the modifier solution of example D. The product resin system comprises (on a 100 dry weight percent basis) about 84 weight percent phenol-formaldehyde resole resin; about 4 weight percent ammonium salt, and about 12 weight percent urea. The system has a pH of about 1.5 when in the form of an aqueous solution of about 35 weight percent total resin system solids. As thus made, however, this system contains about 30 weight percent total resin system solids with the balance up to 100 weight percent being water.

EXAMPLE H

Another phenol-aldehyde resin system treating solution is made by diluting 100 parts of the resin of example B with 100 parts of water and adding thereto 12 parts of the modifier solution of example E. The product resin system comprises (on a 100 dry weight percent basis) about 20 weight percent phenol-formaldehyde resole resin; about 1.5 weight percent ammonium salt, and about 3.5 weight percent urea. The system has a pH of about 2.0 when in the form of an aqueous solution of about 35 weight percent total resin system solids. As thus made, however, this system contains about 25 weight percent total resin system solids, with the balance up to 100 weight percent being water.

EXAMPLE I

Another phenol-aldehyde resin system treating solution is made by diluting 100 parts of the resin of example C with 100 parts of water and adding thereto 20 parts of the modifier solution of example F. The product resin system comprises (on a 100 dry weight percent basis) about 20 weight percent phenol-formaldehyde resole resin; about 1.5 weight percent ammonium salt, and about 4.0 weight percent urea. The system has a pH of about 2.2 when in the form of an aqueous solution of about 35 weight percent total resin system solids. As thus made, however, this system contains about 25 weight percent total resin system solids with the balance up to 100 weight percent being water.

EXAMPLE J

A phenol-formaldehyde-starch adhesive system for use in this invention is prepared as follows:

To 16 weight parts of water is added five parts of the phenol-formaldehyde resin prepared in example A, 2.1 parts of a 23 percent caustic (sodium hydroxide) solution, and 4.4 parts of corn starch.

The resulting mixture is heated to 155°–165° F. with continuous mixing and mixed an additional 10–20 minutes at 155°–165° F. Finally, 13 parts of cooling water is added to the mixture. This product constitutes what can be termed the primary mixture, or carrier portion, of the adhesive system.

Next is prepared the secondary mixture or raw starch portion, as follows:

To 41 parts water is added 18 parts corn starch. The composition is mixed at room temperature.

Finally, the primary mixture and the secondary mixture are admixed together and stirred for about 1 hour. The product is an adhesive system ready for use. The adhesive system has a total phenolic resin to total starch weight ratio (based on total adhesive system solids) of from about 1 to 8.6. It has a total adhesive solids content of about 25 percent, a viscosity of about 800 cps., and a gel point of about 148° F., as determined by heating the adhesive in a water bath heated gradually to the gel temperature.

EXAMPLE K

Another suitable phenol-formaldehyde-starch adhesive system for use in this invention is prepared as follows:

Two hundred gallons of water, 500 points of the phenol-formaldehyde resin as prepared in example A and 450 pounds of corn starch are mixed and heated to about 160° F. Then 20 additional gallons of water with 40 pounds of sodium hydroxide dissolved therein are added to the product mixture. The product mixture is stirred for 10 minutes after which an additional 700 gallons of water is added thereto together with 1800 pounds of corn starch. The resulting mixture is stirred for 1 hour.

The product is an adhesive system ready for use. It has a total solids content of about 25 percent, a viscosity of 1000 cps., and a gel point of 145° F., as indicated above.

The following examples illustrate the manufacture of corrugated fiberboard of the present invention using the above-described resole resins and adhesive systems.

EXAMPLE 1

Each side of a 26 pound basis weight medium paper sheet about 0.009 inch thick are roller coated with modified phenol-aldehyde resin system of example G to a total resins content of about 8 weight percent based on the dry weight of the sheet plus resin. One side of a 42 pound basis Kraft liner paper sheet about 0.009 inch thick is roller coated with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet is corrugated into type B flutes of about 50 per foot, and the phenol-formaldehyde-starch adhesive of example J is applied to the tips of the flutes of the medium corrugations at the rate of about 4 pounds per 1000 ft.$^2$ of product fiberboard. The medium is then combined with two pieces of such liner sheet, one on each side of the adhesive treated medium sheet so as to form a corrugated fiberboard. This board is now exposed to a temperature of about 350° F. for about 2 seconds to dry and thermoset the adhesive. The product is an example of a corrugated fiberboard of this invention. A portion of this product is now exposed to 180° C. for 4 minutes to thermoset resin; this product is another example of a corrugated fiberboard of this invention.

Each such fiberboard product is now cut, scored, slotted, and formed into a box blank, after which the blank prepared from the first made fiberboard is subjected to a temperature of about 400° F. for about 2 minutes to thermoset the resin.

A container is assembled from a blank made with above made resin cured fiberboard and one is made from a blank made with above made nonresin cured fiberboard. The containers are compression tested for strength (top to bottom) ASTM Test Procedure D–642–47.

The treated containers display much greater strength than the untreated containers after testing at (a) 50 percent relative humidity/24 hrs. at 72° F., (b) 95 percent relative humidity/24 hrs. at 72° F., and (c) in water for 24 hrs.

EXAMPLE 2

Using the procedure of example 1, but employing a container assembled from board made in accordance with as the medium a 33 pound basis weight 0.009 inch thick having a 10 weight percent resin content and a 5–8 percent volatiles content, and employing as the liner a 69-pound basis weight paper (thickness) having a 5 weight per cent resin content and a 5–8 percent volatiles content, similar blanks and containers are made and compression tested (top to bottom). The corrugated medium has type C flutes of about 40 per foot.

The treated containers display very much greater strength than the untreated containers after testing at (a) 50 percent relative humidity/24 hrs. at 72° F., (b) 95 percent relative humidity/24 hrs. at 72° F., and (c) in water for 24 hrs.

EXAMPLE 3

A 33 pound basis weight 0.009 inch thick medium sheet is immersed in a solution of resin of example G and dried. The corrugated medium has type C flutes of about 40 per foot. The product sheet has a total resin content of 10 weight percent based on the weight of the sheet plus resin and a volatiles content of 5–8 percent. After corrugation, a phenol-formaldehyde-starch adhesive system of example K is applied to the tips of the corrugations and then combined with untreated 42 pound basis weight Kraft liner paper sheets 0.009 inch thick to form corrugated fiberboard which is then heated to 340° F. for 3 seconds. The product board is scored, die cut, slotted, and then heated in a forced draft oven for 2 minutes at 400° F. to cure the resin. Another board is made as above, except that the porous medium paper sheet is not treated with resin. The two boards are tested for flat crush strength (ASTM Test Procedure D–1255–54.

The treated containers display much greater strength than the untreated containers after testing at (a) 50 percent relative humidity/24 hrs. at 72° F., (b) 90 percent relative humidity/24 hrs. at 72° F., and (c) in water for 24 hrs.

The above clearly shows the superiority in wet strength of boxboard and containers made in accordance with this invention over those commercially available

EXAMPLES 4–6

Using the procedure of example 1, additional corrugated boxboards are made. In each instance, the medium, the liner, the treating resin, and the adhesive are as indicated in table IV below. In each instance, the product corrugated fiberboard displays excellent resistance to deterioration in strength in the presence of moisture of water using ASTM Test Procedure D–1225–D)

Similarly, each of the corrugated fiberboard constructions of this invention made in the foregoing examples 1–3 when similarly tested likewise display excellent resistance to deterioration and strength when in the presence of moisture as determined by ASTM Test Procedure 1225–54.

maldehyde to phenol mol ratio of from about 0.9 to 3.0,
b. from about 1 to 5 weight percent of at least one inorganic ammonium salt having a pH of from about 0.8 to 6.5 when in a 5 weight percent aqueous solution, and
c. the remainder up to 100 weight percent (same basis) of any given such system being urea, 2. said phenol-formaldehyde resole being characterized by having:
a. a water solubility such that a 55 weight percent aqueous solution thereof can be prepared,
b. a pH of from about 7 to 9.2 when in the form of an aqueous solution of about 35 weight percent total resin solids, and
c. an ash content of less than about 2.5 weight percent (based on a 35 weight percent solution of total resin solid), B. as a liner, a sheet member having a thickness of from about 5 to 20 thousandths of an inch and having a grade weight of from about 33 to 120 pounds per 1000 sq. ft.,
C. an adhesive comprising a phenol-formaldehyde-starch system characterized by:
1. having a total phenolic to total starch weight ratio (based on total adhesive system solids) of about 1 to 8, and
2. containing at least about 70 weight of starch (based on total adhesive systems solids), D. said corrugated medium sheet member being positioned adjacent said liner sheet member and being bonded thereto at positions of mutual contact therebetween by

TABLE IV

| Example Number | Medium [1] | | Liner | | Treating resin system | | | | | Adhesive | |
| --- | --- | --- | --- | --- | --- | --- | --- | --- | --- | --- | --- |
| | Thickness | Grade weight | Thickness | Grade weight | Ex. No. | Amount in medium, percent | | Amount in liner, percent | | Ex. No. | Amount adhesive applied [2] |
| | | | | | | Resin | Vol. | Resin | Vol. | | |
| 4 | .009 | 26 | 15 | 62 | H | 12 | 8 | 3 | 5 | J | 4 |
| 5 | .009 | 33 | 15 | 62 | I | 10 | 6 | 7 | 8 | K | 4 |
| 6 | .009 | 33 | 15 | 62 | G | 12 | 7 | | | J | 4 |

[1] Flutes in corrugated medium are Type B (about 50 per foot).
[2] Lbs./1,000 ft.² of product board.

What is claimed is:
1. A corrugated fiberboard construction adapted to be rigid when wet comprising:
A. as a medium, a corrugated paper sheet member having a thickness of from about seven to 15 thousandths of an inch and a grade weight of from about 25 to 36 pounds per 1000 sq. ft., said medium sheet member containing from about 5 to 15 weight percent (dry weight basis) of a modified phenol-aldehyde resin system and said medium sheet member having a total volatiles content of from about 5 to 10 weight percent,
1. said modified phenol-aldehyde resin system having a pH in the range of from about 0.8 to 6 when in the form of an aqueous solution of about 35 weight percent total resin system solids and comprising:
a. from about 80 to 94 weight percent (based on total modified phenol-aldehyde resin system dry weight basis) of a phenol-formaldehyde resole having a for- said adhesive, and
E. such resulting construction having been subjected to a temperature of from about 320° F. to 450° F. for, inversely, a time of from about 0.5 seconds to 10 minutes.

2. The fiberboard construction of claim 1 wherein said liner sheet member contains from about 2 to 10 weight percent (dry weight basis) of said modified phenol-aldehyde resin system and said liner sheet member has a total volatiles content of from about 5 to 10 weight percent.

3. A box blank prepared from a corrugate fiberboard construction of claim 1.

4. A box blank prepared from a corrugated fiberboard construction of claim 2.

5. The fiberboard construction of claim 1 wherein said adhesive contains at least about 1 weight percent (based on total adhesive system solids) of combined formaldehyde.

* * * * *

PO-1050
(5/69)

UNITED STATES PATENT OFFICE
CERTIFICATE OF CORRECTION

Patent No. 3,619,342      Dated September 19, 1972

Inventor(s) WILLIAM D. BURKE

It is certified that error appears in the above-identified patent and that said Letters Patent are hereby corrected as shown below:

Please correct the above-identified patent as follows:

Title page, line 7, change "Alton, Del." to

----Alton, Ill.----

Signed and sealed this 27th day of March 1973.

(SEAL)
Attest:

EDWARD M. FLETCHER, JR.      ROBERT GOTTSCHALK
Attesting Officer      Commissioner of Patents